United States Patent
Lee (10) Patent No.: US 8,040,454 B2
(45) Date of Patent: Oct. 18, 2011

(54) LIQUID CRYSTAL DISPLAY

(75) Inventor: Sook Jin Lee, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 311 days.

(21) Appl. No.: 12/005,623

(22) Filed: Dec. 28, 2007

(65) Prior Publication Data

US 2008/0198291 A1    Aug. 21, 2008

(30) Foreign Application Priority Data

Feb. 15, 2007  (KR) .................. 10-2007-0016119

(51) Int. Cl.
*G02F 1/1333* (2006.01)
(52) U.S. Cl. ........................................... 349/58
(58) Field of Classification Search .................. None
See application file for complete search history.

(56) References Cited

U.S. PATENT DOCUMENTS

| | | | |
|---|---|---|---|
| 5,719,752 A | 2/1998 | Mori et al. | |
| 6,392,724 B2 * | 5/2002 | An et al. | 349/58 |
| 6,593,979 B1 * | 7/2003 | Ha et al. | 349/58 |
| 6,741,298 B1 * | 5/2004 | Won | 349/58 |
| 6,816,211 B2 * | 11/2004 | Kim et al. | 349/58 |
| 7,095,462 B2 * | 8/2006 | Ahn | 349/58 |
| 2002/0180661 A1 * | 12/2002 | An | 345/4 |
| 2003/0234895 A1 * | 12/2003 | Sugawara et al. | 349/58 |
| 2004/0212756 A1 * | 10/2004 | Fukayama et al. | 349/58 |
| 2006/0044745 A1 * | 3/2006 | Kim | 361/681 |

FOREIGN PATENT DOCUMENTS

| | | |
|---|---|---|
| JP | 2000-333100 | 11/2000 |
| JP | 2003-066863 | 3/2003 |
| KR | 10-2000-0050938 | 8/2000 |
| KR | 10-2006-0087928 | 8/2006 |

* cited by examiner

*Primary Examiner* — Thanh-Nhan Nguyen
(74) *Attorney, Agent, or Firm* — McKenna Long & Aldridge, LLP (57) ABSTRACT

A liquid crystal display includes a cover bottom and a cover shield. The liquid crystal display includes a nut coupled to a bracket through a fastening bolt. An upper portion and a lower portion of the nut have different diameters.

4 Claims, 6 Drawing Sheets

LIQUID CRYSTAL DISPLAY

This application claims the benefit of Korean Patent Application No. 2007-016119 filed on Feb. 15, 2007, which is hereby incorporated by reference as if fully set forth herein.

BACKGROUND OF THE INVENTION

1. Field of the Invention

The present invention relates to a liquid crystal display, and more particularly to a liquid crystal display with a modified nut structure to be fastened to a main body of a system.

2. Discussion of the Related Art

A liquid crystal display is configured by coupling a liquid crystal panel and a back light unit. Since the liquid crystal display is not a self-emission display device, the liquid crystal display requires a back light unit including a light source.

The back light unit including a light source may be classified into a direct-type back light unit and an edge-type back light unit according to the position of the light source.

In the direct-type back light unit, a number of light sources are disposed directly below a liquid crystal panel to irradiate light projected from the light sources onto the liquid crystal panel through a diffusion plate and a number of optical sheets. A general liquid crystal display including the direct-type back light unit is configured such that the liquid crystal panel and the back light unit are fastened to each other by a support main, a top case, a bottom cover and the like.

In the edge-type back light unit, a light source is installed at one side edge of a liquid crystal panel to irradiate light projected from the light source onto the liquid crystal panel through a light guiding plate and a number of optical sheets.

Figure 1:
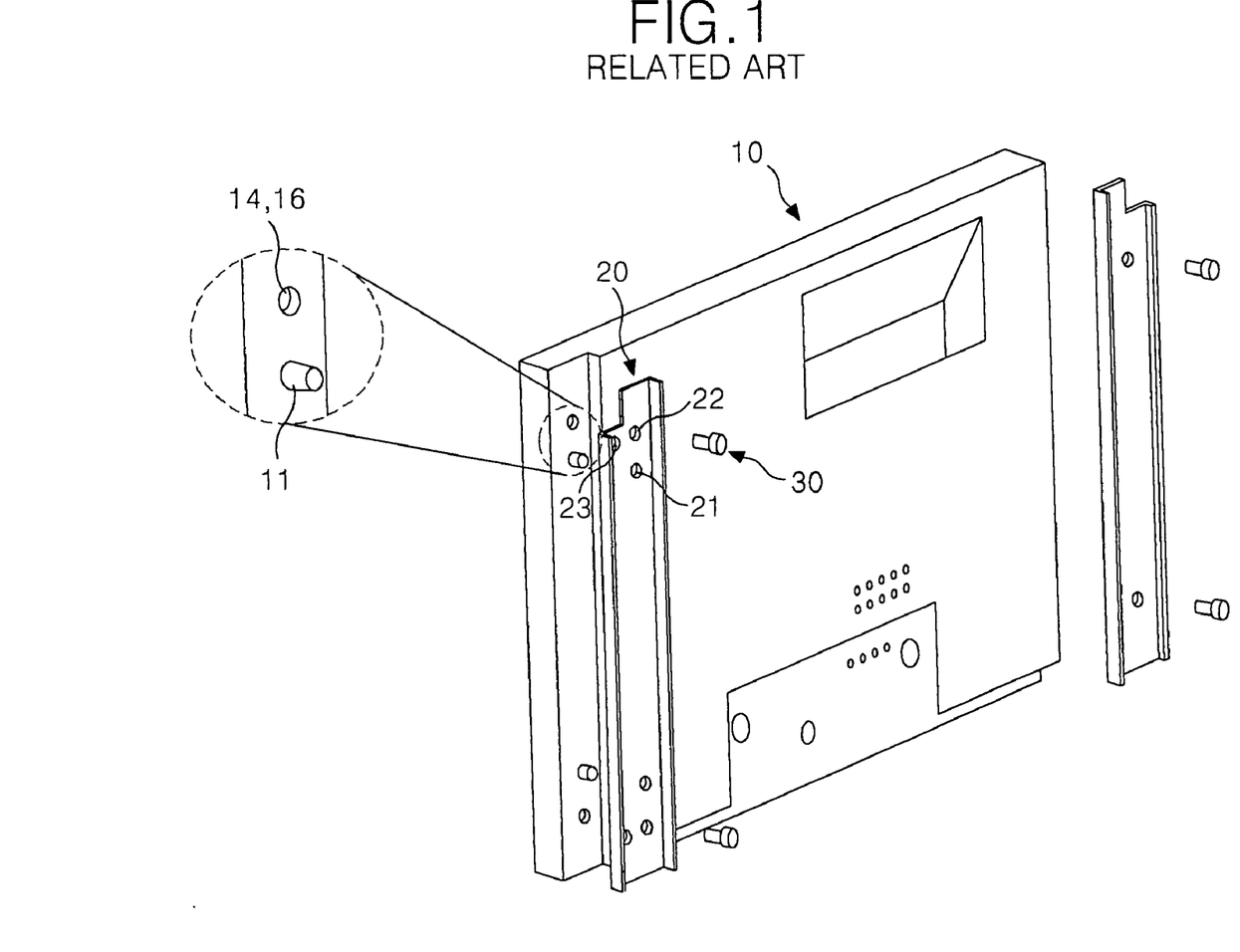
FIG. 1 is an exemplary diagram showing a rear surface of a related art liquid crystal display.

FIG. 1 illustrates an exemplary diagram showing a rear surface of a general liquid crystal display, which shows a connection state of the rear surface of the general liquid crystal display and a bracket.

The liquid crystal display is used as a component of a relatively large-scale system such as a monitor, a laptop computer or a TV, and also used as a component of a small-scale application (system) such as a navigation system, a PDP or a PMP. Generally, the liquid crystal display is manufactured through a separate process and is coupled to a main body of the system to be mounted in one case for sale.

As described above, generally, a bracket 20 shown in FIG. 1 is used to couple a liquid crystal display 10 to a main body of a system.

Three holes 21, 22, 23 are formed at each of an upper portion and a lower portion of the bracket 20. A guide pin 11 formed on a lower surface of the liquid crystal display 10 is inserted into the first hole 21 among the three holes 21, 22, 23. A first fastening bolt 30 is inserted into the second hole 22 to be fastened to a nut 14 formed on the lower surface of the liquid crystal display 10. A second fastening bolt (not shown) is inserted into the third hole 23 to be fastened to the main body.

Figure 2:
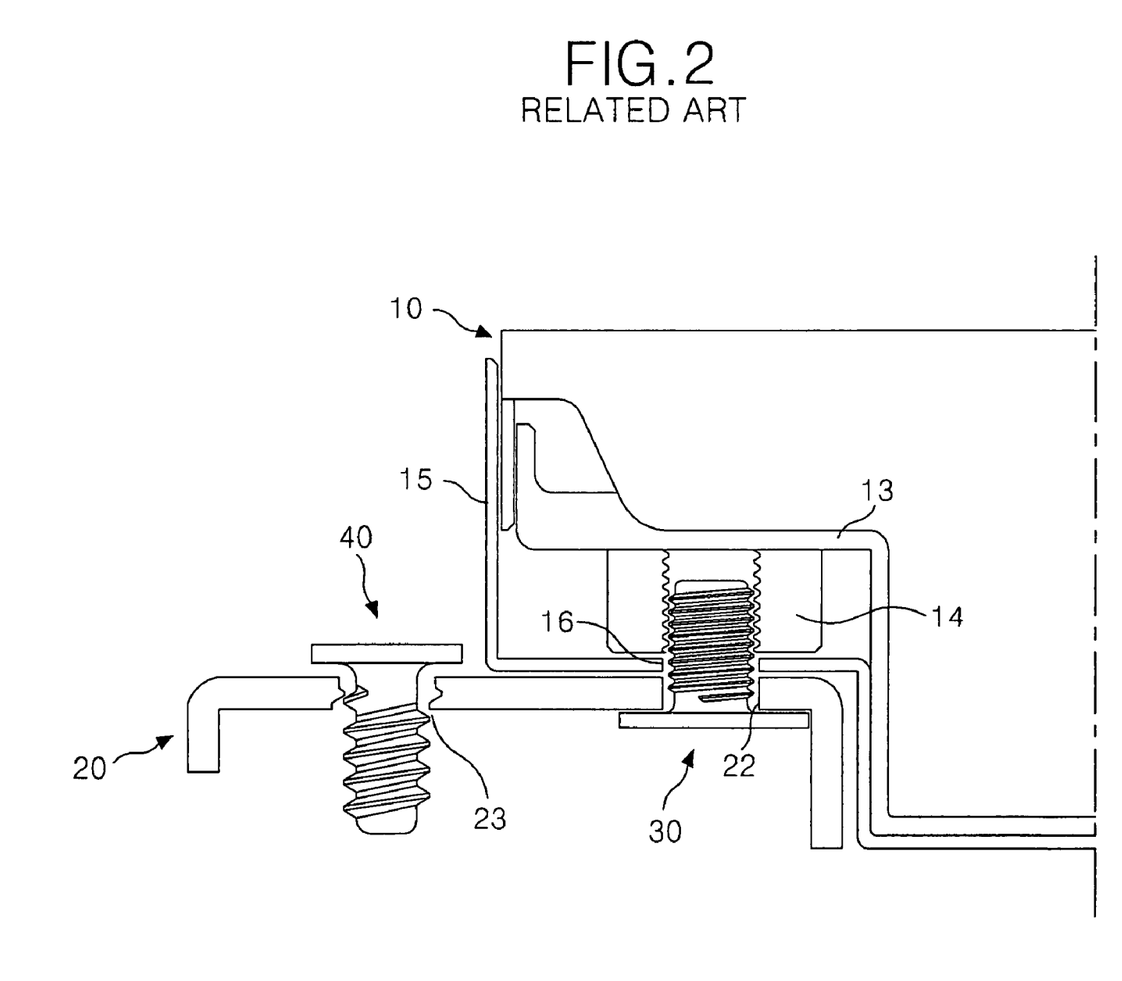
FIG. 2 is a cross-sectional view showing a state where the liquid crystal display and a bracket shown in FIG. 1 are fastened to each other by a fastening bolt.

FIG. 2 illustrates a cross-sectional view showing a state where the liquid crystal display and the bracket shown in FIG. 1 are fastened to each other by the fastening bolt.

In general, as shown in FIGS. 1 and 2, the nut 14 is formed on a cover bottom 13 which supports a lower surface of the liquid crystal display 10. The first fastening bolt 30 inserted into the second hole 22 of the bracket 20 is fastened to the nut 14 through a cover shield hole 16 formed on a cover shield 15 surrounding the cover bottom 13. Further, the second fastening bolt 40 inserted into the third hole 23 of the bracket 20 is fastened to a nut formed on the main body (not shown) of the system.

Before the first fastening bolt 30 is coupled to the nut 14 as described above, the second hole 22 of the bracket 20 should correspond to a position of the nut 14 (the cover shield hole 16 and the nut 14 have been already aligned). In the related art, the guide pin 11 which is formed on the cover bottom 13 or the cover shield 15 is used to align the second hole 22 corresponding to the nut 14.

That is, the guide pins 11 are formed on an upper portion and a lower portion of the rear surface of the related art liquid crystal display, respectively. The guide pins 11 are inserted into the first holes 21 respectively formed on the upper portion and the lower portion of the bracket, thereby arranging the second holes 22 of the bracket and the nut 14.

However, in order to couple the bracket 20 to the related art liquid crystal display 10 as described above, first, a process for inserting the guide pin 11 formed on the rear surface of the liquid crystal display into the first hole 21 of the bracket 20 to align positions of the second hole 22 of the bracket and the nut 14 should be performed. Then, a process for coupling and fastening the first fastening bolt 30 inserted into the second hole 22 to the nut 14 should be performed.

Accordingly, a pair of the guide pin 11 and the cover shield hole 16 having a specified interval should be formed at each of an upper portion and a lower portion of the rear surface of the related art liquid crystal display. Thus, for formation of the guide pin 11 and the cover shield hole 16, an elaborate process is required. Also, there is a problem of increasing the manufacturing cost and the cost of parts due to a complicated structure.

Further, since the related art liquid crystal display requires a process for forming fine holes, although an alignment process using the guide pins 11 is performed, the first fastening bolt 30 may be inaccurately inserted into the second hole 22 and the nut 14 due to an error generated in the alignment of the second hole 22 of the bracket 20 and the nut 14.

SUMMARY OF THE INVENTION

Accordingly, the present invention is directed to a liquid crystal display that substantially obviates one or more problems due to limitations and disadvantages of the related art.

An advantage of the present invention is to provide a liquid crystal display which performs an alignment function with a bracket and has a nut coupled to the bracket through a fastening bolt.

Additional features and advantages of the invention will be set forth in the description which follows and in part will become apparent from the description, or may be learned from practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described, a liquid crystal display having a cover bottom and a cover shield, includes a nut coupled to a bracket through a fastening bolt, wherein an upper portion and a lower portion of the nut have different diameters.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE INVENTION

Reference will now be made in detail to embodiments of the present invention, examples of which are illustrated in the accompanying drawings.

Figure 3:
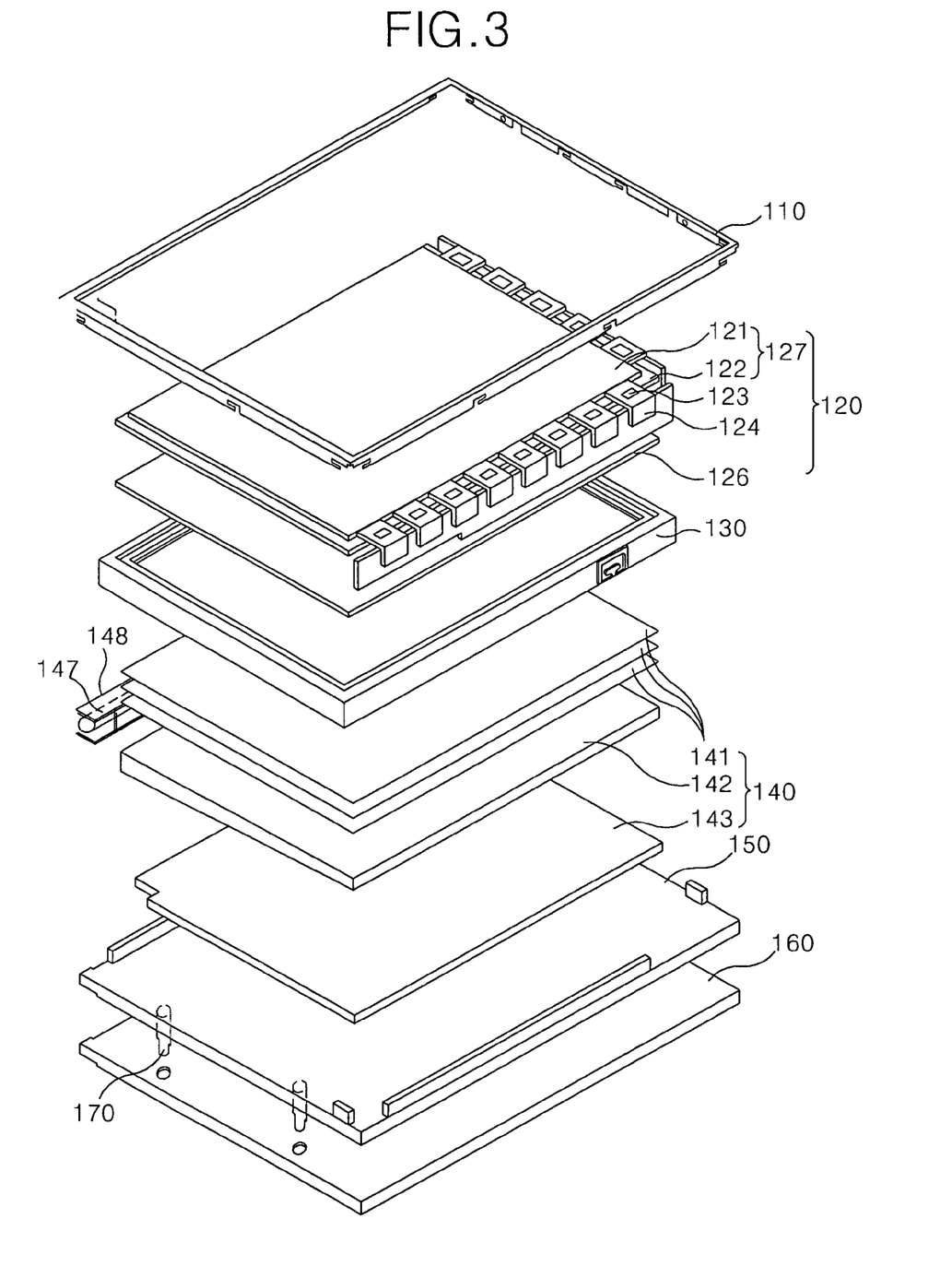
FIG. 3 is a configuration of a liquid crystal display using an edge-type back light unit according to one embodiment of the present invention.

FIG. 3 illustrates a configuration of a liquid crystal display using an edge-type back light unit according to one embodiment of the present invention, particularly, a configuration of a liquid crystal display which may be applied to a small-scale application (system) such as a navigation system mounted and used in a vehicle.

As shown in FIG. 3, the liquid crystal display using an edge-type back light unit according to the embodiment of the present invention includes a liquid crystal display panel 120; a back light unit 140 which irradiates light onto the liquid crystal display panel 120; a cover bottom 150 which receives the liquid crystal display panel 120 and the back light unit 140; a guide panel 130 which is disposed between the back light unit 140 and the liquid crystal display panel 120 to support the liquid crystal display panel 120 and also to be fastened to a side surface of the cover bottom 150; a top case 110 which covers a periphery of the liquid crystal display panel 120 and a sidewall of the guide panel 130; and a cover shield 160 which entirely protects the components on a rear surface of the liquid crystal display.

In a liquid crystal panel 127 of the liquid crystal display panel 120, liquid crystal cells are arranged in an active matrix form between an upper substrate 121 and a lower substrate 122. Further, thin film transistors are formed at the liquid crystal cells, respectively, to switch video signals. The respective refractive indexes of the liquid crystal cells are changed according to the video signals, thereby displaying an image corresponding to the video signals. A tape carrier package 124 with a driver integrated circuit 123 for applying driving signals to the thin film transistors is attached onto the lower substrate 122 of the liquid crystal display panel 120. Further, a polarizing film 126 is disposed on a front and rear surface of the liquid crystal display panel 120 (front polarizing film is not shown). The polarizing film 126 serves to improve a viewing angle of the image displayed by the liquid crystal cells.

The back light unit 140 includes a lamp 147 which is supplied with power from an external power source to irradiate light onto the liquid crystal panel 127; a light guiding plate 142 which guides light incident through a light incident portion formed on a side surface opposite to the lamp 147 to the liquid crystal panel 127; a lamp housing 148 which covers the lamp 147 and the light incident portion of the light guiding plate 142; a reflective sheet 143 which is disposed on a rear surface of the light guiding plate 142; and a number of optical sheets 141 which improve efficiency of light emitted from the light guiding plate 142 to irradiate the light onto the liquid crystal panel 127.

The guide panel 130 bent in an "L" shape is mounted on an upper peripheral surface of the cover bottom 150 and also covers the side surface of the cover bottom 150. The guide panel 130 includes a mounting portion for mounting a rear surface of the liquid crystal panel 127 and a sidewall for guiding a side surface of the liquid crystal panel 127 to support the liquid crystal panel 127.

The top case 110 is manufactured in a rectangular stripe shape having a plane portion and a side portion bent at a right angle. The top case 110 covers the periphery of the liquid crystal panel 127 and the side surface of the cover bottom 150.

The cover bottom 150 is a molded structure of a plastic material, wherein an inner sidewall surface thereof is formed as a stepped projection surface. The back light unit 140, the guide panel 130 and the liquid crystal display panel 120 are stacked on the stepped projection surface of the cover bottom 150.

The cover shield 160 functions to entirely protect the above-mentioned components on the rear surface of the liquid crystal display including the above-mentioned components.

Meanwhile, nuts 170 are formed on one side surface of the cover bottom 150 or the cover shield 160 among the above-mentioned components. The nuts 170 are coupled to a bracket through fastening bolts while performing an alignment of the bracket. The bracket is coupled to a main body of the application (system) through the fastening bolts.

Also in the following description, the nuts 170 are formed on the cover bottom 150 as shown in FIG. 3, but the embodiment of the present invention is not limited thereto. That is, the nuts 170 may be formed on the cover shield 160.

The structure and function of the nuts 170 will be described in detail later with reference to FIGS. 5 and 6.

Figure 4:
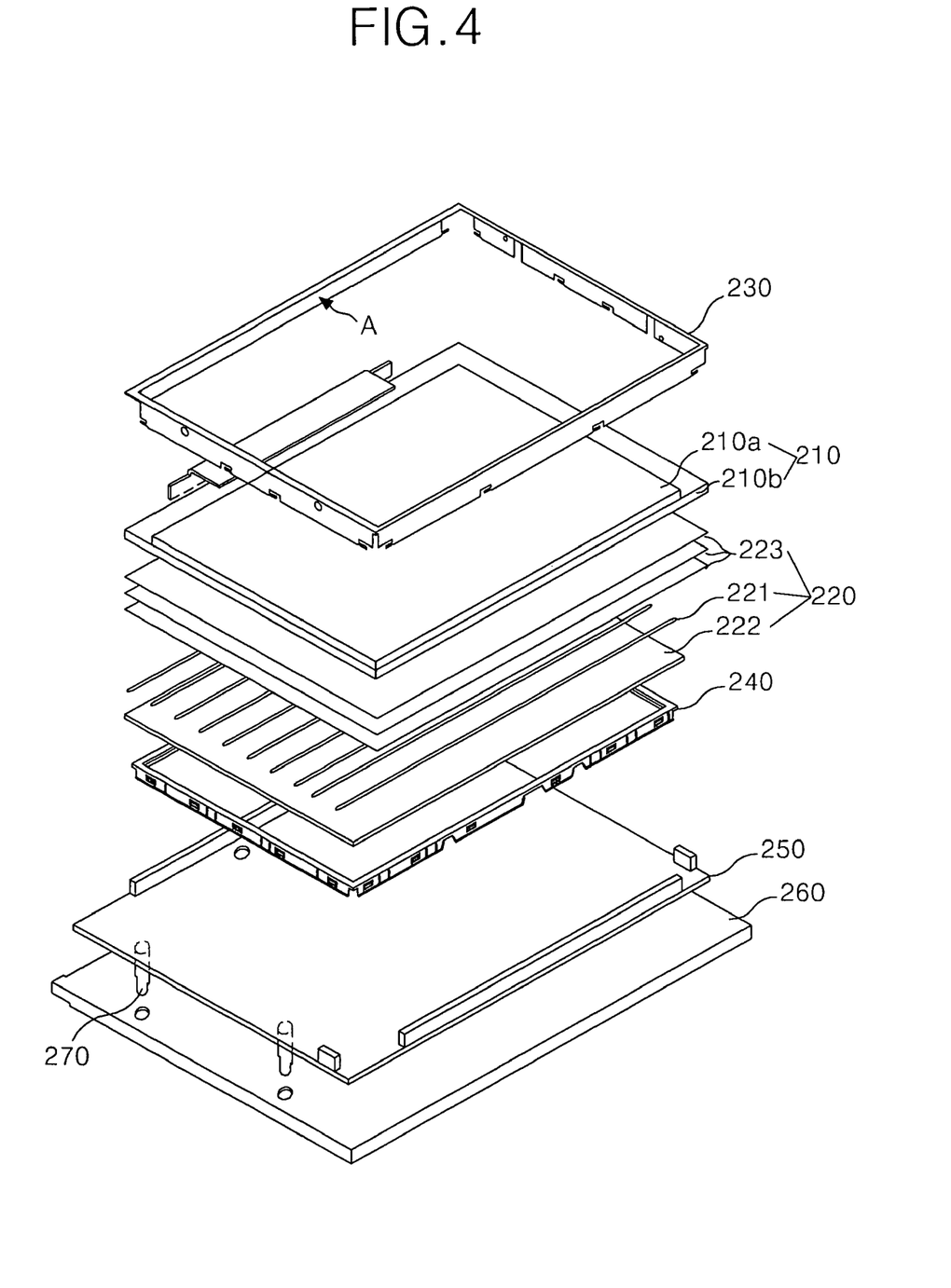
FIG. 4 is a configuration of a liquid crystal display using a direct-type back light unit according to another embodiment of the present invention.

FIG. 4 illustrates a configuration of a liquid crystal display using a direct-type back light unit according to another embodiment of the present invention, particularly, a configuration of a liquid crystal display which may be applied to a small-scale application (system) such as a navigation system mounted and used in a vehicle. In the following description related to FIG. 4, the repeated description of the components explained in FIG. 3 will be given in brief.

As shown in FIG. 4, the liquid crystal display using an direct-type back light unit according to the embodiment of the present invention includes a liquid crystal panel 210, a back light unit 220, a support main 240, a top case 230, a cover bottom 250 and a cover shield 260.

The liquid crystal panel 210 includes two substrates 210a and 210b facing each other and a liquid crystal layer (not shown) disposed between the two substrates 210a and 210b.

The back light unit 220 serves to supply light at a lower portion of the liquid crystal panel 210. A number of lamps 221 of the back light unit 220 serving as a light source are arranged in parallel. A reflective sheet 222 is disposed below the lamps 221 and a number of optical sheets 223 are stacked above the lamps 221.

The liquid crystal panel 210 and the back light unit 220 are mounted on the support main 240. The support main 240 supports the liquid crystal panel 210 and the back light unit 220 while preventing the movement of the liquid crystal panel 210 and the back light unit 220.

The top case 230 covers an upper peripheral portion of the liquid crystal panel 210 and a side surface of the support main 240 to support and protect the periphery of the liquid crystal panel 210 and the side surface of the support main 240.

The cover bottom 250 covers a lower portion of the support main 240 to protect a lower portion of the liquid crystal display. The cover bottom 250 is fastened to the top case 230 and the support main 240 through a fastening means (not shown) to be modularized.

The cover shield 260 functions to entirely protect the above-mentioned components on the rear surface of the liquid crystal display including the above-mentioned components.

Meanwhile, nuts 270 are formed on one side surface of the cover bottom 250 or the cover shield 260 among the above-mentioned components. The nuts 270 are coupled to a bracket through fastening bolts while performing an alignment of the bracket. The bracket is coupled to a main body of the application (system) through the fastening bolts.

Also in the following description, the nuts 270 are formed on the cover bottom 250 as shown in FIG. 4, but the embodiment of the present invention is not limited thereto. That is, the nuts 270 may be formed on the cover shield 260.

The structure and function of the nuts 170 and 270 will be described below in detail with reference to FIGS. 5 and 6.

Figure 5:
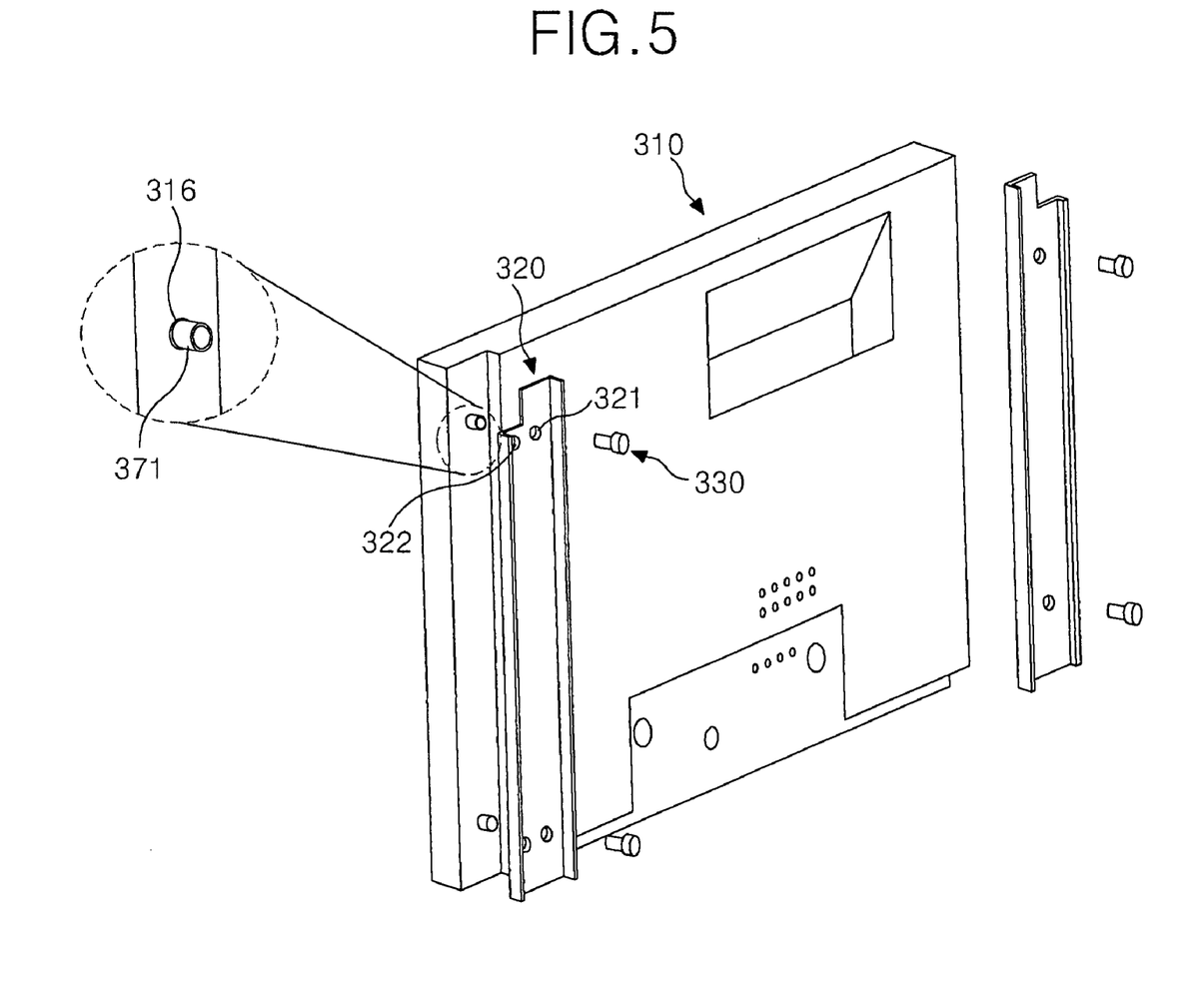
FIG. 5 is an exemplary diagram showing a rear surface of the liquid crystal display according to embodiments of the present invention.
Figure 6:
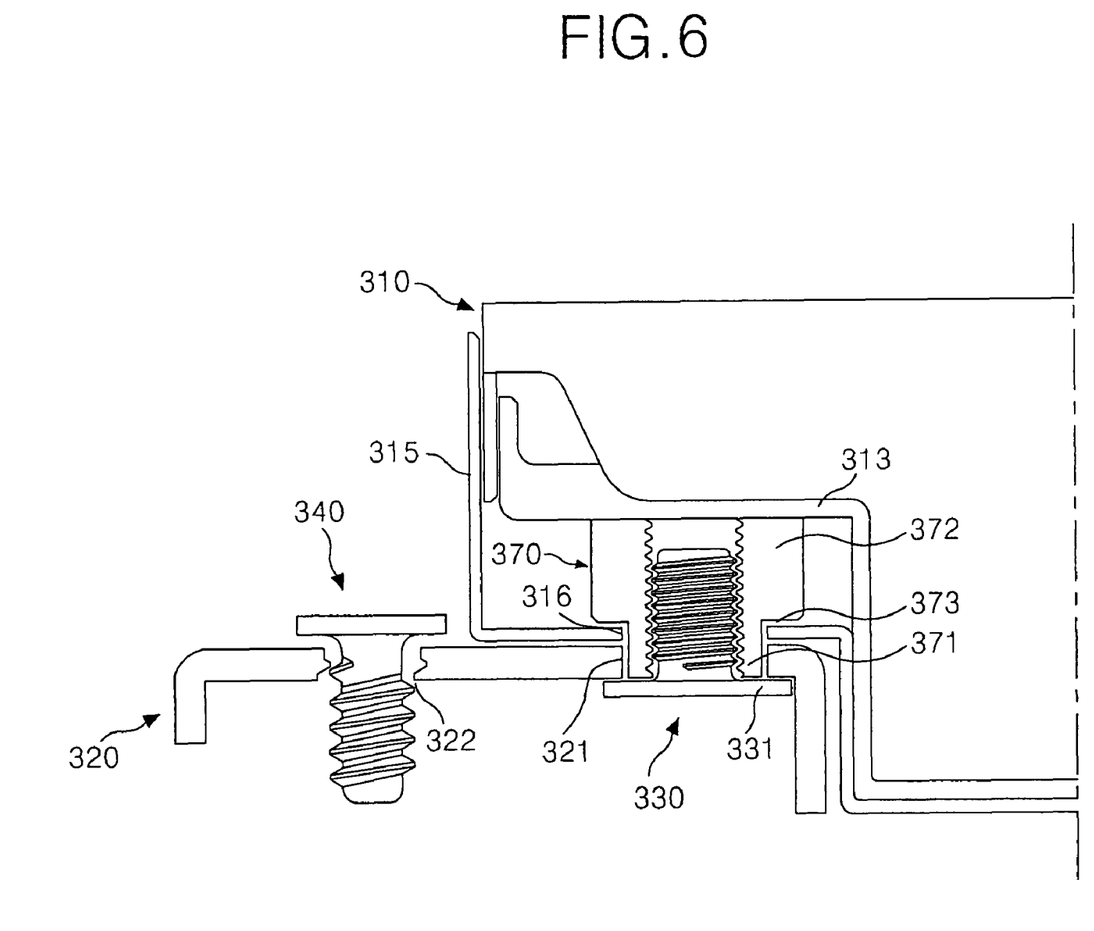
FIG. 6 is a cross-sectional view showing a state where the liquid crystal display and a bracket shown in FIG. 5 are fastened to each other by a fastening bolt.

FIG. 5 illustrates an exemplary diagram showing the rear surface of the liquid crystal display according to the embodiments of the present invention, which shows a connection state of the rear surface of the liquid crystal display shown in FIG. 3 or 4 and the bracket. Further, FIG. 6 illustrates a cross-sectional view showing a state where the liquid crystal display and the bracket shown in FIG. 5 are fastened to each other by fastening bolts.

The embodiments of the present invention relate to a liquid crystal display which is applicable to a small-scale application (system) such as a navigation system mounted and used in a vehicle, a PMP, or a PDA. A liquid crystal display 310 shown in FIG. 5 may be formed by the components shown in FIG. 3 or 4.

A bracket 320 is used to couple the liquid crystal display 310 to a main body (not shown) of the system. The bracket 320 is fastened to the liquid crystal display 310 through first fastening bolts 330 and is fastened to the main body of the system through second fastening bolts 340.

As shown in FIG. 5, first fastening holes 321 are respectively formed at an upper end portion and a lower end portion of the bracket 320 for the above-mentioned coupling.

Meanwhile, as in the above description related to FIGS. 3 and 4, nuts (for example, Pem nuts) 370 which are fastened to the first fastening bolts 330 are formed on a cover bottom 313 of the liquid crystal display according to the embodiment of the present invention. As shown in FIGS. 5 and 6, guide portions 371 forming upper ends of the nuts 370 are protruded through cover shield holes 316 formed on a cover shield 315 to be inserted into the first fastening holes 321 of the bracket 320.

A coupling state of the nuts 370 having the above configuration and the bracket 320 is explained below with reference to FIG. 6.

As described above, the nuts 370 are formed on the cover bottom 313 of the liquid crystal display according to the embodiments of the present invention and the nuts 370 have a two-step configuration. That is, the nuts 370 include support portions 372 coupled to the cover bottom 313 and the guide portions 371 having a diameter smaller than that of the support portions 372. Thus, the support portions 372 and the guide portions 371 are configured in a stepped projection shape.

The cover shield 315 is placed on portions which are formed in a stepped projection shape (hereinafter, simply referred to as "stepped projection portions") 373 of the support portions 372 and the guide portions 371. Accordingly, the cover shield holes 316 formed on the cover shield 315 may be formed to have a diameter greater than that of the guide portions 371 and smaller than that of the support portions 372.

Further, the guide portions 371 may have a length smaller than or equal to the sum of the thickness of the cover shield 315 and the thickness of the bracket 320. Accordingly, as shown in FIG. 6, the guide portions 371 may pass through the cover shield holes 316 formed on the cover shield 315 and the first fastening holes 321 formed on the bracket 320.

In order to couple the liquid crystal display 310 having the above configuration and the bracket 320, first, the guide portions 371 should be inserted into the first fastening holes 321 formed on the bracket 320. For this, the guide portions 371 are formed to be protruded from the cover shield holes 316 of the cover shield 315 in an assembly step of the liquid crystal display 310.

When the guide portions 371 are inserted into the first fastening holes 321, the first fastening bolts 330 are inserted along screw lines formed on inner surfaces of the guide portions 371. Since the screw lines are formed from the inner surfaces of the guide portions 371 to the inner surfaces of the support portions 372, the first fastening bolts 330 may be inserted to the inner surfaces of the support portions 372. Further, since the diameter of heads 331 of the first fastening bolts 330 is greater than the diameter of the first fastening holes 321 formed on the bracket 320, the bracket 320 may be fixed between the heads 331 of the first fastening bolts 330 and the stepped projection portions 373 of the nuts 370.

Meanwhile, the nuts 370 are respectively formed at an upper portion and a lower portion of the rear surface of the liquid crystal display 310 and the nuts 370 are coupled with the two first fastening bolts 330, respectively, thereby coupling the bracket 320 to the liquid crystal display 310 without movement.

Further, the bracket 320 is coupled to the nuts 370 at opposite left and right sides of the rear surface of the liquid crystal display. That is, when the two brackets 320 are coupled to the liquid crystal display at opposite left and right sides of the liquid crystal display 310, the second fastening bolts 340 are coupled to the main body of the system through second fastening holes 322 formed on the brackets, thereby coupling the liquid crystal display to the main body (not shown) of the system.

As described above, the liquid crystal display according to the embodiments of the present invention has effects of simplifying the structure and reducing the material costs by removing guide pins.

Further, the liquid crystal display according to the embodiments of the present invention has an effect of reducing a failure ratio by simplifying the structure.

Further, the liquid crystal display according to the embodiments of the present invention has an effect of simplifying a process for fastening the liquid crystal display to the main body of the system by simplifying the structure.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display including a cover bottom and a cover shield, comprising:
   a nut coupled to a bracket through a fastening bolt, wherein an upper portion and a lower portion of the nut have different diameters, and the nut has a guide portion protruded through a cover shield hole formed on the cover shield and inserted into a fastening hole of the bracket, the guide portion has a length smaller than or equal to the sum of the thickness of the cover shield and the thickness of the bracket,
   wherein the nut includes:
   a support portion formed on a rear surface of the cover bottom;
   the guide portion having an outer diameter smaller than an outer diameter of the support portion; and
   a stepped projection portion having a stepped projection shape at a boundary of the support portion and the guide portion,
   wherein the bracket and cover shield are fixed between head of the fastening bolt and the stepped projection portion of the nut, and
   wherein flat outer surfaces of the guide portion are opposite to side surfaces of the bracket exposed through the fastening hole and side surfaces of the cover shield exposed through the cover shield hole.

2. The liquid crystal display of claim 1, wherein the cover shield hole formed on the cover shield is placed on the stepped projection portion.

3. The liquid crystal display of claim 1, wherein the fastening bolt is fastened to the guide portion through the fastening hole.

4. The liquid crystal display of claim 1, wherein the nut is formed on a rear surface of the cover bottom.

* * * * *